United States Patent [19]

Oparin et al.

[11] Patent Number: 5,677,983

[45] Date of Patent: Oct. 14, 1997

[54] LIGHT BEAM HEATER WITH LIGHT SOURCE AND REFLECTOR HAVING TWO ELLIPSOIDAL SECTIONS AND A TRUNCATED SPHERICAL SURFACE THERE BETWEEN

[75] Inventors: Mikhail Ivanovich Oparin; Mikhail Timofeevich Borisov; Georgy Mikhailovich Alexeev, all of Moscow, Russian Federation

[73] Assignees: Nauchno-proizvodstvennaya firma "Adonis"; Nauchno-proizvodstvennaya firma "MGM", both of Moscow, Russian Federation

[21] Appl. No.: 371,440

[22] Filed: Jan. 11, 1995

[51] Int. Cl.$^6$ ............................................. F21V 7/00
[52] U.S. Cl. ...................... 392/421; 392/419; 219/85.12
[58] Field of Search .................................. 392/420, 421; 219/85.12, 85.13, 383; 313/113, 114; 250/504 R; 362/261, 304, 305, 297, 346

[56] References Cited

U.S. PATENT DOCUMENTS

| | | | |
|---|---|---|---|
| 3,383,540 | 5/1968 | Walters | 362/297 |
| 3,774,995 | 11/1973 | Perret | 359/869 |
| 3,798,441 | 3/1974 | Wilson | 362/261 |
| 3,801,773 | 4/1974 | Matsumi . | |
| 4,241,382 | 12/1980 | Daniel | 362/255 |
| 4,754,381 | 6/1988 | Downs | 362/297 |
| 4,858,090 | 8/1989 | Downs | 362/297 |
| 5,418,420 | 5/1995 | Roberts | 362/304 |

FOREIGN PATENT DOCUMENTS

| | | | |
|---|---|---|---|
| 375649 | 2/1922 | Germany | 362/304 |
| 554927 | 7/1932 | Germany | 362/297 |
| 3319562 | 2/1984 | Germany . | |
| 225183 | 7/1985 | Germany | 362/297 |
| 4345010 | 7/1995 | Germany . | |
| 657243 | 9/1951 | United Kingdom | 313/113 |
| 1 522 345 | 8/1978 | United Kingdom . | |
| 9409312 | 4/1994 | WIPO . | |
| 9424587 | 10/1994 | WIPO . | |

*Primary Examiner*—Tu B. Hoang
*Attorney, Agent, or Firm*—Gary M. Nath; Nath & Associates

[57] ABSTRACT

An apparatus for light-beam treatment comprises a radiation concentrator having a reflecting surface which is formed by a first surface of revolution, which is a truncated surface of revolution of a first ellipsoid of revolution, by a second surface which is a truncated surface of revolution of a second ellipsoid of revolution, the concentrator further having an additional reflecting truncated spherical surface located between said first and said second surfaces of revolution. A first and a second focus of the first ellipsoid of revolution are coincident with a first and a second focuses of the second ellipsoid of revolution. The first focus is an emitting one and a gas-discharge light source is positioned therein, and the second focus is a working focus in which a workpiece being treated is placed.

2 Claims, 2 Drawing Sheets

LIGHT BEAM HEATER WITH LIGHT SOURCE AND REFLECTOR HAVING TWO ELLIPSOIDAL SECTIONS AND A TRUNCATED SPHERICAL SURFACE THERE BETWEEN

FIELD OF THE INVENTION

The present invention relates to apparatus for precision heat treatment of materials, and more particularly, to apparatus for light-beam treatment.

It is most advantageous to use the apparatus in automotive industry and other fields for welding thin-sheet structures in automatic and manual modes of operation.

The invention can also find application in repair of automobiles and in welding non-metallic materials.

BACKGROUND OF THE INVENTION

There is a problem at present of welding various metallic and non-metallic materials using the technique of contactless power supply.

In the welding sets considered, used as a power source is a light source and, hence, the welding is actually a light-beam one.

Arc xenon lamps and quartz-halogen incandescent lamps are used in such welding sets. Radiation emitted by the lamps is focused into a point spot on a workpiece being treated by means of a metal mirror reflectors having an optimum shape of the section of a reflecting surface.

As against the conventional types of heating the surfaces being welded, heating with a light beam features essential advantages. The method makes it possible:

- to carry out contactless power supply to a workpiece and to conduct the process of treatment directly in the air and also in an atmosphere of shielding gases and in a vacuum;
- to weld thin-sheet 0.1- to 1.0-mm low-carbon steels used in the body components of automobiles and other facilities in the air without shielding gases;
- to replace gas welding and soldering;
- to carry out heating of both metallic and non-metallic materials, which permits of welding similar and dissimilar materials, glass, ceramics, plastic materials;
- to obtian a sufficiently high energy efficiency of up to 45% of the electric power supplied (for comparison, the efficiency of the best gas lasers is not more than 10%);
- to have a high degree of adjustability and controllability of heat supply due to both variation of the lamp mode of operation and defocusing;
- to place comparatively low requirements on the proficiency of welding operators, mastering the technique of conducting the processes of welding and soldering being rather simple;
- to have a high degree of electrical and explosion safety;
- to have an ecologically pure process.

One of the main problems of improving the apparatus for light-beam welding is reduction of losses of light energy in an emitter itself and actually an increase of the apparatus efficiency.

Known in the art is an apparatus for light-beam treatment (see, for example, U.S. Pat. No. 3,774,995, 1973), which comprises a reflector and an arc light source, the reflector being shaped as an ellipsoid and the arc light source being placed in the reflector focus.

This apparatus fails to effect concentration of high energy in one point, which hinders its use in welding operations.

It is to be noted that most energetically valuable are zones of the reflector (ellipsoids), which zones are at an angle to the optical axis equal to 90+20 and on which the most radiant-intensive flux of the arc light source is incident, in particular, of an arc xenon lamp.

An apparatus is known for light-beam treatment (see, for example, U.S. Pat. No. 4,858,090, 1989), which comprises an energy concentrator the reflecting surface of which is formed by principal ellipsoids, truncated on the open side, and an additional ellipsoid and a light source. The light sources are located in the first emitting focuses of the three principal ellipsoids and the major axis of the additional ellipsoid is disposed parallel to a plane in which lie the major axes of the principal ellipsoids. The second focuses of the principal ellipsoids are coincident with the focus of the additional ellipsoid.

This apparatus is not sufficiently efficient in conducting welding operations since large energy losses arise because the light source is disposed not in the focus of the additional ellipsoid, and the latter receives the beams from the principal ellipsoids.

Also known in the art is an apparatus for light-beam treatment (see laid-open FRG Application No. 3319562, 1984), which comprises an arc light source and an energy concentrator having an open cavity formed thereinside, which is defined by surfaces of revolution arranged in line and in series and formed by a principal ellipsoid truncated on the open side and conjugated with an additional ellipsoid truncated on two sides. Said light source is located in an emitting focus coincident with the focuses of the additional and principal ellipsoids, and there are also a return reflector and a light corrector.

Focusing of a light beam on the surface of the material being heated is effected by its multiple reflection from said surfaces by means of the return reflector, which results in large energy losses and is a serious disadvantage of the apparatus.

It is, therefore, an object of the present invention to provide an apparatus for light-beam treatment wherein the design of a radiation concentrator allows of increasing the efficiency of operation of the apparatus due to reducing the back light fluxes and increasing the degree of utilization of radiation of a gas-discharge light source.

This object is achieved in an apparatus for light-beam treatment, wherein, according to the present invention, a radiation concentrator has a reflecting surface which is made up of two surfaces of revolution, a first surface of revolution is formed by the surface of a first truncated ellipsoid of revolution and a second surface of revolution is formed by the surface of a second truncated ellipsoid of revolution, major axes of said ellipsoids of revolution are coincident, and first and second focuses of said first truncated ellipsoid of revolution are coincident with first and second focuses of said second ellipsoid of revolution, respectively, said first focus being an emitting focus of said radiation concentrator, said second focus being a working focus of said radiation concentrator and intended for locating therein a workpiece being treated, an outlet opening is positioned between said second focus of said second ellipsoid of revolution and its minor axis, a gas-discharge light source is located in the emitting focus, the section of said first ellipsoid of revolution is positioned in a first plane perpendicular to the major axis thereof and found between the emitting focus and the outlet opening, and there is provided an additional reflecting truncated spherical surface having its center coincident with the emitting focus, which surface is positioned between the first surface of revolution and the second surface of revolution.

It is preferable that the section of the first ellipsoid of revolution and the first section of the additional truncated reflecting spherical surface be located in one plane and have equal radii.

The design of the apparatus for light-beam treatment, according to the invention, makes it possible to increase the spanning angle of the principal ellipsoid up to 180 degrees of arc and more, and to decrease the axial size of the return reflector and the share of its participation in creating a light flux. All this permits of increasing substantially the efficiency of the apparatus.

BRIEF DESCRIPTION OF THE DRAWINGS

A specific embodiment of the invention will now be described in detail with reference to the accompanying drawings, in which.

DETAILED DESCRIPTION OF A PREFERRED EMBODIMENT OF THE INVENTION

Figure 1:
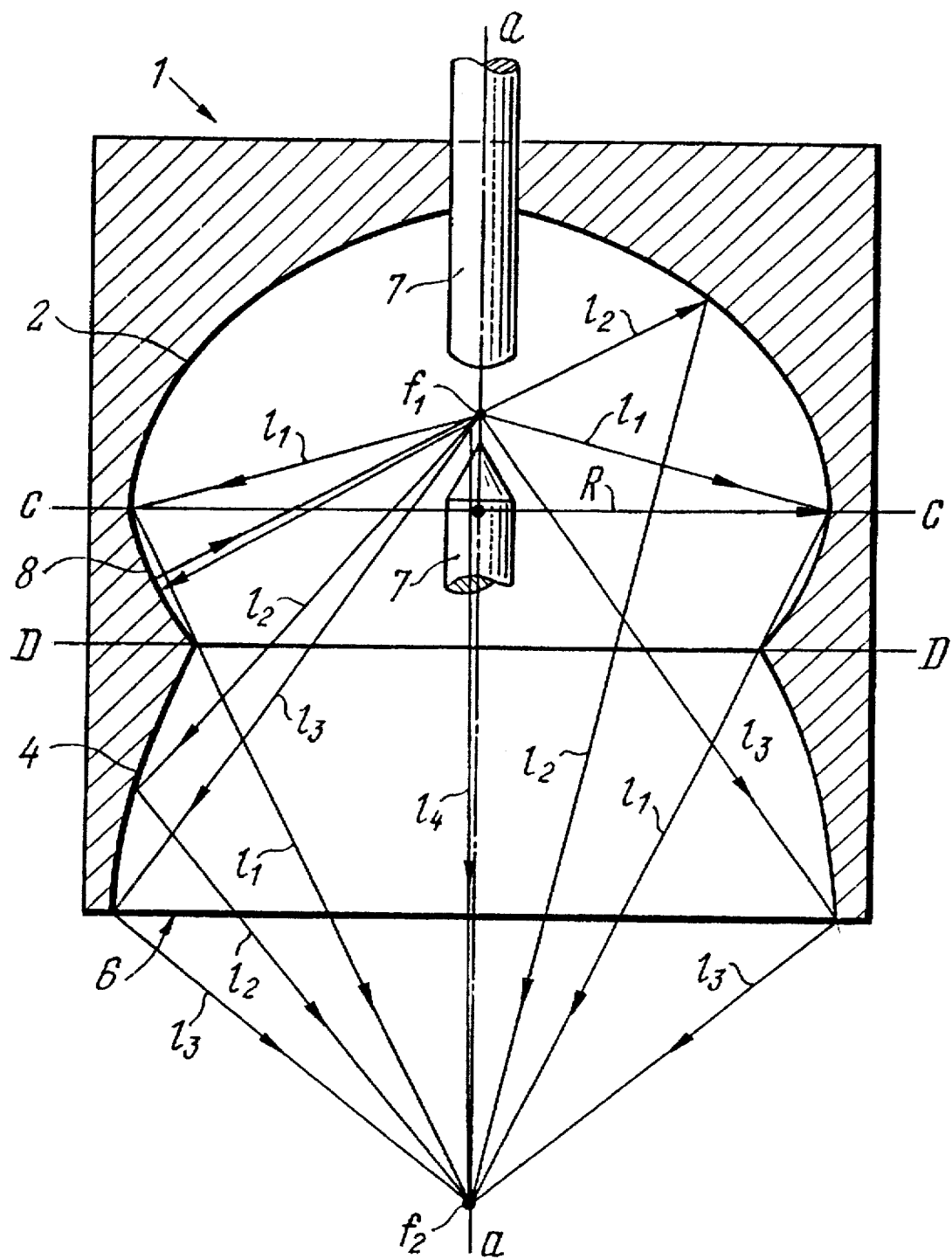
FIG. 1 is a longitudinal section view of an apparatus for light-beam treatment, according to the invention.
Figure 2:
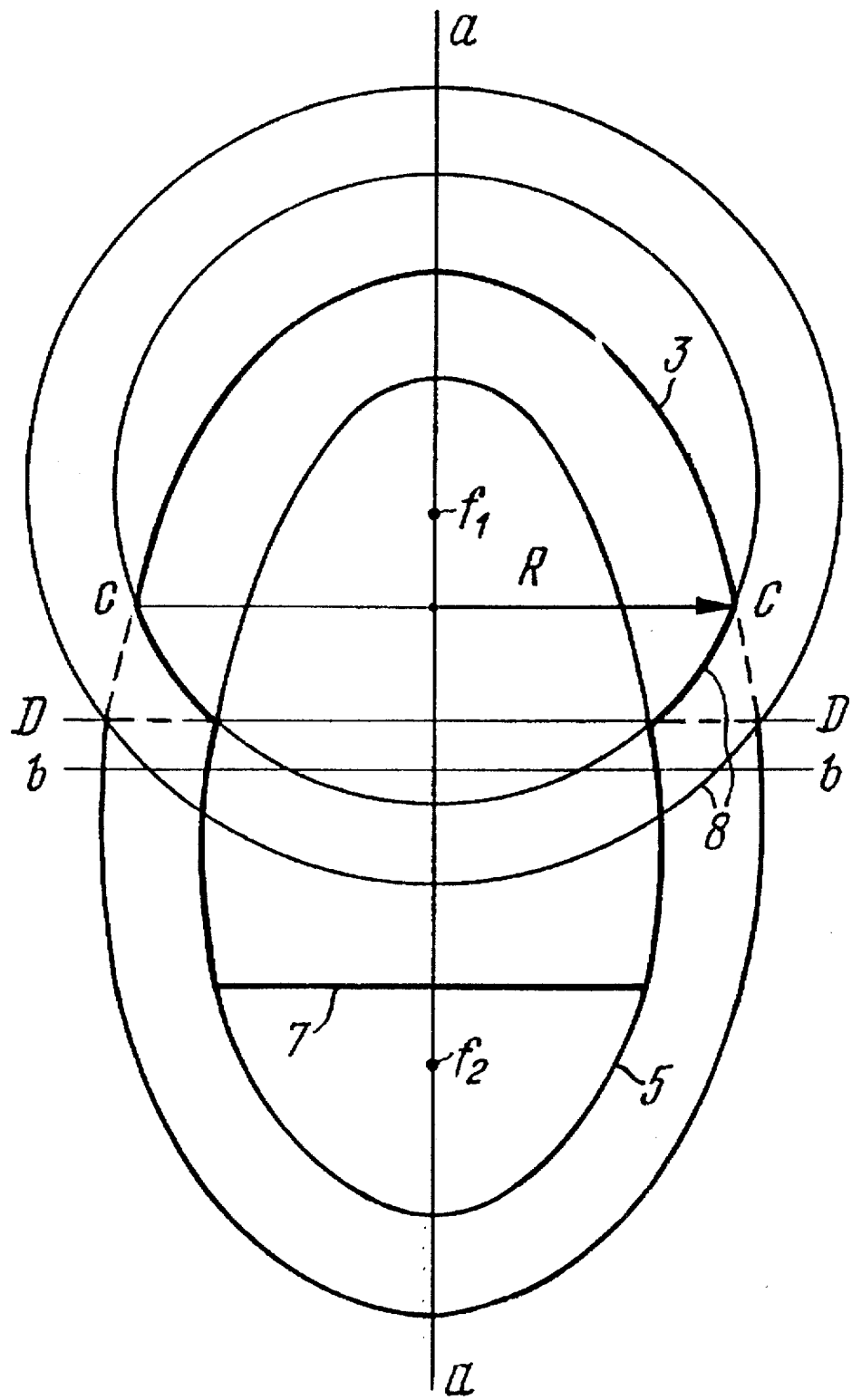
FIG. 2 shows schematically relative positions of ellipses and a circumference which define the section of the apparatus for light-beam treatment, according to the invention.

An apparatus for light-beam treatment comprises a radiation concentrator 1 (FIG. 1) having a reflecting surface made up of a first and a second surfaces of revolution. Said first surface of revolution 2, is formed by the surface of a first truncated ellipsoid 3 (FIG. 2) of revolution, and said second surface of revolution, 4, is formed by the surface of a second truncated ellipsoid of revolution, 5. Major axes a—a of said first and second ellipsoids of revolution, 3, 5, are coincident and a first and a second focuses, $f_1$, $F_2$, of the first ellipsoid 3 of revolution coincide with a first and a second focuses of the second ellipsoids 5 of revolution, respectively.

The first focus $f_1$ is an emitting focus of the radiation concentrator 1. The second focus $f_2$ is a working focus of the radiation concentrator 1 and is intended for locating therein a workpiece being treated (not shown in FIG. 1).

An outlet opening 6 of the radiation concentrator 1 is between the second focus $f_2$ of the second ellipsoid 5 of revolution and a minor axis thereof.

A gas-discharge light source 7 (FIG. 1) is disposed in the emitting focus $f_1$ of the radiation concentrator 1.

The section of the first ellipsoid 3 of revolution is located in a first plane C—C which is perpendicular to the major axis of the ellipsoid of revolution, 3, and is found between the emitting focus $F_1$ and the outlet opening 6 of the concentrator.

A second plane D—D is perpendicular to the axis a—a and is found between the first plane C—C and the outlet opening 6 of the concentrator.

An additional reflecting truncated spherical surface 8 is positioned between the first and second surfaces of revolution, 2, 4, and its center coincides with the emitting focus $f_1$ of the concentrator 1. A first section of the spherical surface 8 is in the first plane C—C and a second section is in the second plane D—D.

The section of the first ellipsoid 3 of revolution and the first section of the additional truncated reflecting spherical surface 8 are positioned in the first plane C—C. In the embodiment of the invention being disclosed, both said sections have equal radius R of the circumference. An embodiment of the invention (shown in a dashed line in FIG. 2) is possible, where the circumferences have different radii, in particular, the radius of the spherical surface 8 is larger than the radius of the first ellipsoid section.

The apparatus for light-beam treatment operates as follows.

Light beams from the light source are directed to the working focus $f_2$ in four paths.

A first part of the light radiation from the source 7 is incident onto the first surface of revolution, 2, and being reflected therefrom due to the focal location of the source 7 is concentrated in the working focus $f_2$. This light flux is denoted by $l_1$.

A second part of the light radiation gets onto the additional reflecting spherical surface 8 which is positioned such that the light beams reflected therefrom pass through the focus $f_1$ and, being reflected from the surface 2 or 3, are concentrated in the working focus $f_2$. This light flux is denoted by $l_2$.

A third portion of the light radiation from the source 7 is incident onto the second surface of revolution, 4, and, being reflected therefrom, is concentrated in the working focus $f_2$. This light flux is denoted by $l_3$.

The fourth light flux is denoted by $l_4$; this flux comprises direct beams which are incident onto the working focus $f_2$ from the source 7.

To reduce manufacturing costs, the concentrator can be made from aluminum alloys with a polished reflecting surface. This does not exclude the use of other materials and technologies for the manufacture of the energy concentrator.

Employment in the apparatus of arc xenon lamps in conjunction with the focusing reflector of the present invention ensures obtaining the highest energy densities sufficient for melting most of the structural materials. For practical implementation of the invention, use is made of lamps of up to 2 kW in manual portable apparatuses and lamps of up to 10 kW in stationary apparatuses.

The invention is intended, and has passed an evaluation test in a portable apparatus, for welding thin-sheet structures of steel up to 1.0 mm thick, for high-temperature brazing and low-temperature soldering, welding of plastic materials, heat treatment, melting, removal of old paintwork and other operations involving heating of materials.

What is claimed is:

1. An apparatus for light-beam treatment, which comprises a radiation concentrator having a reflecting surface which is made up of a first and a second surfaces of revolution, said first surface of revolution being formed by the surface of a first truncated ellipsoid of revolution and said second surface of revolution being formed by the surface of a second truncated ellipsoid of revolution, the major axes of said first and said second ellipsoids of revolution are coincident and first and second focuses of said first ellipsoid of revolution are coincident with first and second focuses of said second ellipsoid of revolution, respectively, said first focus which is an emitting focus of said radiation concentrator, said second focus which is a working focus of said radiation concentrator and is intended for being the location of a workpiece to be treated, an outlet opening of said radiation concentrator located between said second focus of said second ellipsoid of revolution and its minor axis, a gas-discharge light source positioned in said emitting focus of said radiation concentrator, a first plane perpendicular to the major axis of said first ellipsoid of revolution and disposed between said emitting focus and said outlet opening of the concentrator, a section of said first ellipsoid of revolution located in said first plane, a second plane perpendicular to the major axis of said first ellipsoid and located between said first plane and said outlet opening of the concentrator, an additional reflecting truncated spherical surface having its center coincident with the emitting focus of said radiation concentrator, said additional reflecting surface being positioned between said first surface of revolution, and said second surface of revolution a first section of which is in said first plane and a second section of which is in said second plane.

2. An apparatus as claimed in claim 1, wherein said section of the first ellipsoid of revolution and said first section of the additional truncated reflecting spherical surface, both positioned in said first plane, have equal radius.

* * * * *